United States Patent
Ishii et al.

(10) Patent No.: US 9,712,079 B2
(45) Date of Patent: Jul. 18, 2017

(54) ELECTRIC POWER CONVERTER AND CONTROL METHOD FOR ELECTRIC POWER CONVERTER

(71) Applicant: KABUSHIKI KAISHA YASKAWA DENKI, Kitakyushu-shi (JP)

(72) Inventors: Sadao Ishii, Fukuoka (JP); Katsutoshi Yamanaka, Fukuoka (JP); Tsuyoshi Higuchi, Fukuoka (JP); Takashi Kuboyama, Fukuoka (JP); Yutaro Ihara, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 408 days.

(21) Appl. No.: 14/541,029

(22) Filed: Nov. 13, 2014

(65) Prior Publication Data

US 2015/0070952 A1    Mar. 12, 2015

Related U.S. Application Data

(63) Continuation of application No. PCT/JP2012/063038, filed on May 22, 2012.

(51) Int. Cl.
*H02M 7/48* (2007.01)
*H02M 7/219* (2006.01)
(Continued)

(52) U.S. Cl.
CPC .......... *H02M 7/219* (2013.01); *H02M 5/272* (2013.01); *H02M 7/48* (2013.01); *H02M 7/5395* (2013.01);
(Continued)

(58) Field of Classification Search
None
See application file for complete search history.

(56) References Cited

U.S. PATENT DOCUMENTS 7,782,643 B2 * 8/2010 Hara .................. H02M 5/293
363/148
2005/0286281 A1   12/2005 Victor et al.
(Continued)

FOREIGN PATENT DOCUMENTS

EP          2400650         12/2011
JP       2005-168136         6/2005
(Continued)

OTHER PUBLICATIONS

Ishii et al., "Bidirectional DC-AC Conversion Topology Using Matrix Converter Technique", 2010 International Power Electronics Conference, IPEC-SAPPORO 2010, Jun. 21, 2010, pp. 2768-2773, XP031729010, See Cite No. 3.
(Continued)

*Primary Examiner* — Jeffrey Gblende
(74) *Attorney, Agent, or Firm* — Mori & Ward, LLP

(57) ABSTRACT

An electric power converter according to an embodiment includes a switching unit, a controller, and a second bidirectional switch. The switching unit includes a plurality of first bidirectional switches disposed between a DC power source and an AC load or between a DC load and an AC power source. The controller controls the switching unit to perform power conversion between DC power and AC power. When turning off the second bidirectional switch disposed on a path between one pole of the DC power source or the DC load and the switching unit, the controller turns on the first bidirectional switch connected between the other pole of the DC power source and the AC load or between the other pole of the DC load and the AC power source.

10 Claims, 7 Drawing Sheets

(51) Int. Cl.
- *H02M 5/27* (2006.01)
- *H02M 7/5395* (2006.01)
- *H02M 7/797* (2006.01)
- *H02M 1/12* (2006.01)

(52) U.S. Cl.
CPC ...... *H02M 7/797* (2013.01); *H02M 2001/123* (2013.01)

(56) References Cited

U.S. PATENT DOCUMENTS

| | | | | |
|---|---|---|---|---|
| 2006/0006832 A1* | 1/2006 | Kitajima | ............... | B60K 6/26 318/800 |
| 2007/0274109 A1* | 11/2007 | Oyobe | ............... | B60K 6/26 363/37 |
| 2010/0013301 A1* | 1/2010 | Hamada | ............... | B60L 11/1803 307/10.1 |
| 2010/0109587 A1* | 5/2010 | Iwahori | ............... | B60L 11/08 318/400.09 |
| 2013/0241290 A1 | 9/2013 | Higuchi et al. | | |

FOREIGN PATENT DOCUMENTS

| | | |
|---|---|---|
| JP | 2006-014591 | 1/2006 |
| WO | WO 2012/063573 | 5/2012 |

OTHER PUBLICATIONS

Supplementary European Search Report far corresponding EP Application No. 12877543.4-1809, Jan. 15, 2016.
European Office Action for corresponding EP Application No. 12 877 543.4-1809, Feb. 4, 2016.
English translation of Written Opinion for corresponding International Application No. PCT/JP2012/063038, Aug. 28, 2012.
Japanese Office Action for corresponding JP Application No. 2012-544367, Jan. 15, 2013.
International Search Report for corresponding International Application No. PCT/JP2012/063038, Aug. 28, 2012.
Written Opinion for corresponding International Application No. PCT/JP2012/063038, Aug. 28, 2012.

* cited by examiner

FIG.2

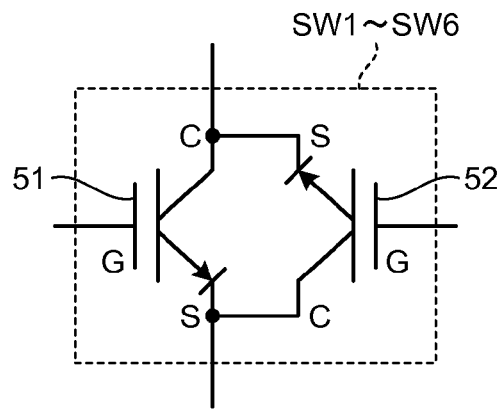

FIG.3

| MODE | PE-RIOD | S1 | S2 | S3 | S4 | S5 | S6 | S7 |
|---|---|---|---|---|---|---|---|---|
| POSITIVE STEP-DOWN MODE | Ton | Low | High | Low | High | High | Low | Low |
| | Toff | Low | Low | Low | High | High | Low | High |
| POSITIVE STEP-UP MODE | Ton | Low | Low | Low | High | High | Low | High |
| | Toff | Low | Low | Low | High | Low | High | High |
| NEGATIVE STEP-DOWN MODE | Ton | Low | Low | High | Low | Low | High | High |
| | Toff | High | Low | High | Low | Low | High | Low |
| NEGATIVE STEP-UP MODE | Ton | Low | Low | High | Low | Low | High | High |
| | Toff | Low | Low | High | Low | High | Low | High |

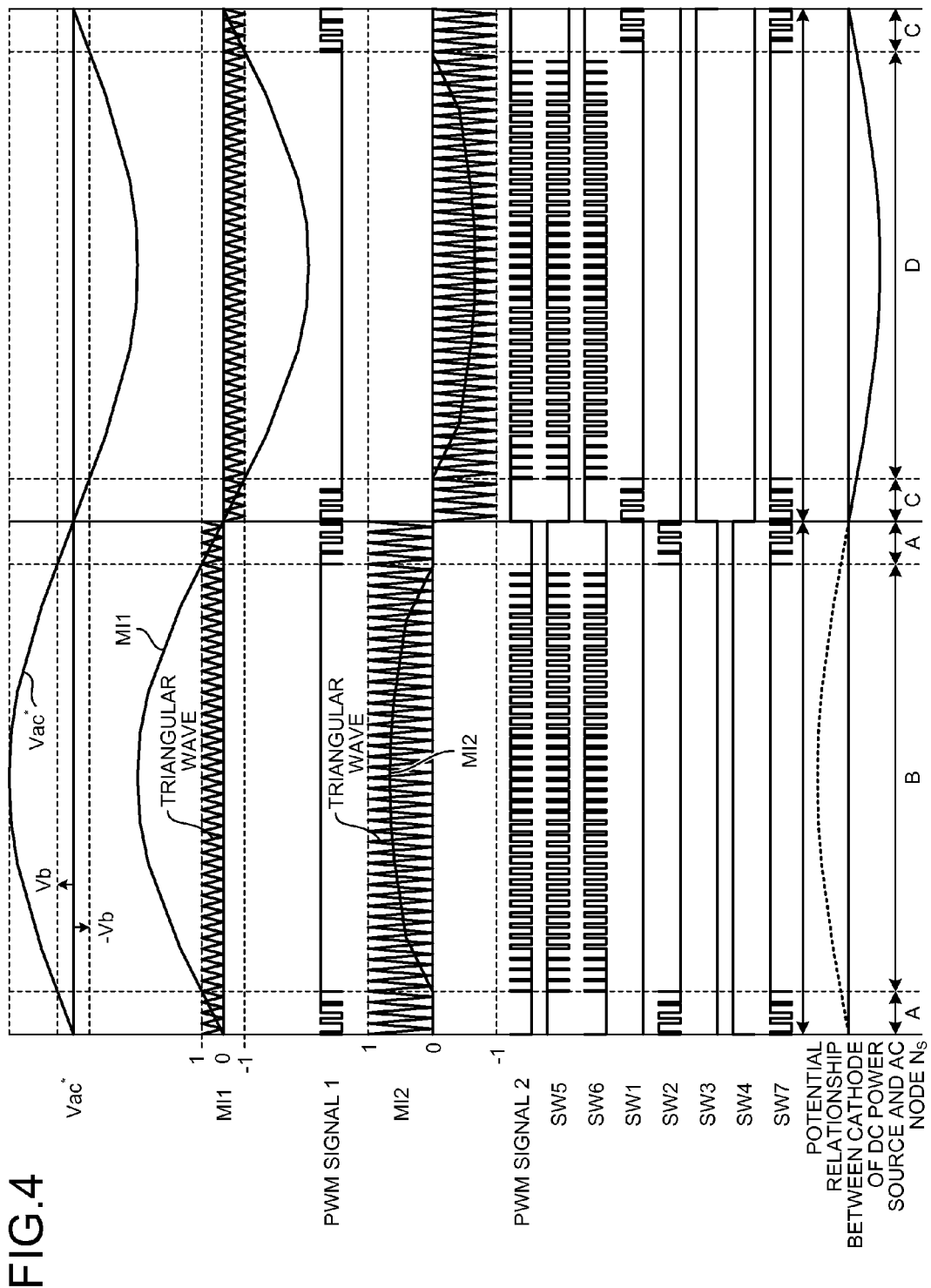

US 9,712,079 B2

ELECTRIC POWER CONVERTER AND CONTROL METHOD FOR ELECTRIC POWER CONVERTER

CROSS-REFERENCE TO RELATED APPLICATIONS

This application is a continuation of PCT international application Ser. No. PCT/JP2012/063038 filed on May 22, 2012 which designates the United States, the entire contents of which are incorporated herein by reference.

FIELD

Embodiments disclosed herein relate to an electric power converter.

BACKGROUND

There is conventionally known an electric power converter which includes a plurality of switches and performs DC to AC power conversion. Such electric power converter employs on/off control of the plurality of switches to convert a DC voltage supplied from a DC power source to an AC voltage which is output.

Japanese Patent Application Laid-open No. 2006-14591 for example describes an electric power converter in which one of a plurality of upper and lower switches included in a single-phase bridge circuit is controlled by a frequency of an AC voltage, and the other of the upper and lower switches is controlled by a frequency higher than the frequency of the AC voltage.

Such electric power converter is provided with a switch connecting a anode of a DC power source and the single-phase bridge circuit, where the switch is turned off in a circulation mode to prevent potential change of high frequency from being applied to the side of the DC power source.

However, there occurs a state where the DC side and the AC side are electrically separated from each other in the electric power converter described in Japanese Patent Application Laid-open No. 2006-14591, thereby causing a problem that a common mode voltage of the DC power source becomes inconstant.

SUMMARY

An electric power converter according to an aspect of embodiments includes a switching unit, a controller, and a second bidirectional switch. The switching unit includes a plurality of first bidirectional switches disposed between a DC power source and an AC load or between a DC load and an AC power source. The controller controls the switching unit to perform power conversion between DC power and AC power. The second bidirectional switch is disposed on a path between one pole of the DC power source or the DC load and the switching unit to perform connection and interruption between the one pole and the switching unit. The controller turns on the first bidirectional switch connected between the other pole of the DC power source and the AC load or between the other pole of the DC load and the AC power source when turning off the second bidirectional switch.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 2 is a diagram illustrating a configuration of a bidirectional switch;

FIG. 3 is a diagram illustrating a control operation performed by a controller in a single cycle of a single-phase AC voltage;

FIG. 4 is a diagram illustrating the control operation performed by the controller in the single cycle of the single-phase AC voltage;

DESCRIPTION OF EMBODIMENTS

Embodiments of an electric power converter disclosed in the present application will now be described in detail with reference to the attached drawings. Note that the present invention is not to be limited to the embodiments described below.

Figure 1:
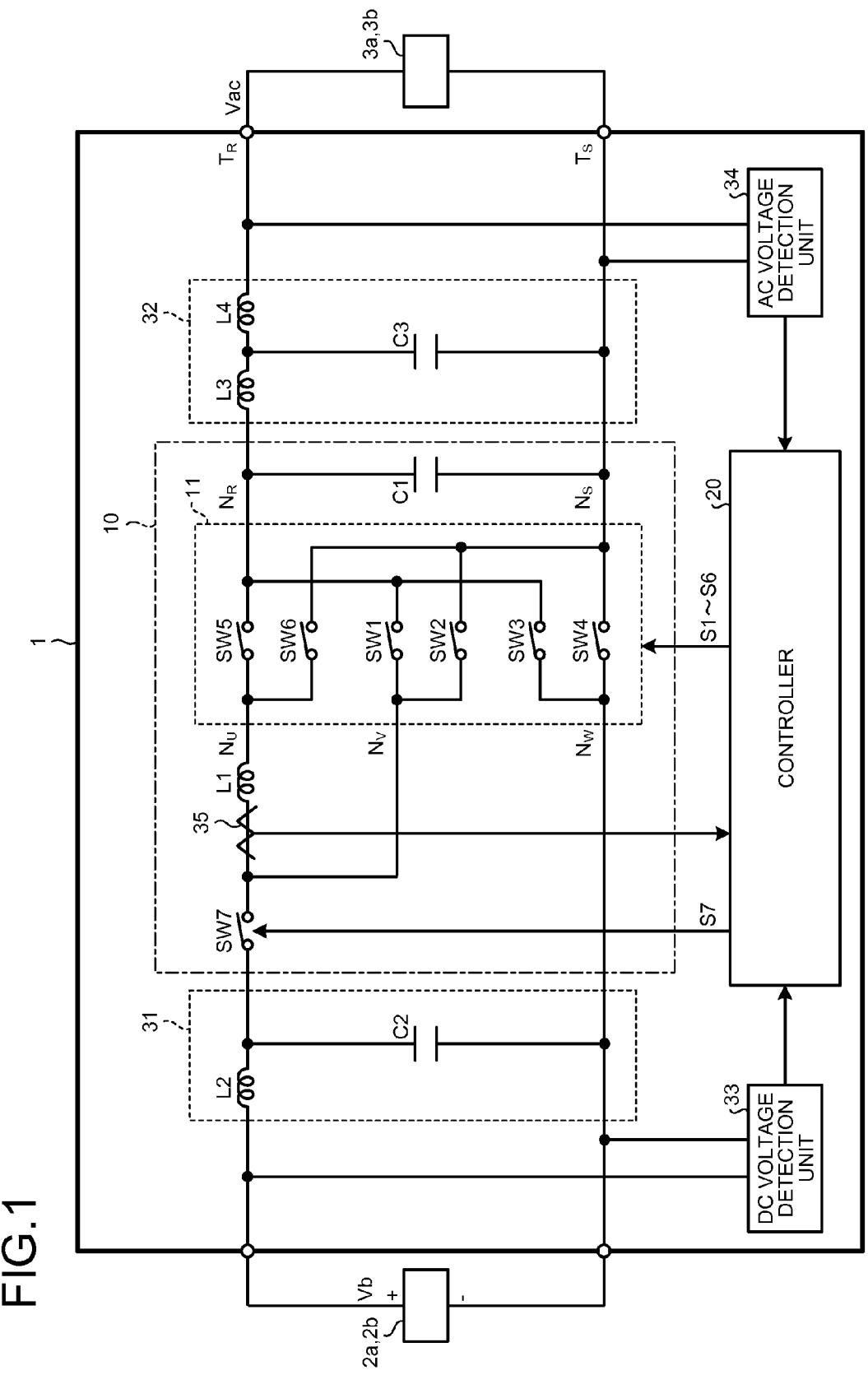
FIG. 1 is a diagram illustrating a configuration of an electric power converter according to an embodiment.

FIG. 1 is a diagram illustrating a configuration of the electric power converter according to an embodiment, and FIG. 2 is a diagram illustrating a configuration of a bidirectional switch. As illustrated in FIG. 1, a DC power source 2a or a DC load 2b and an AC load 3a or an AC power source 3b are connected to a DC side and an AC side of an electric power converter 1, respectively, according to the embodiment. Note that the DC power source 2a can also be included in the electric power converter 1.

The electric power converter 1 performs bidirectional power conversion between DC power and AC power, namely power conversion between the DC power source 2a/DC load 2b and the AC load 3a/AC power source 3b in a reversible manner. When the power conversion from the DC power source 2a to the AC load 3a is performed, a DC voltage Vb supplied from the DC power source 2a is converted to a single-phase AC voltage Vac to be output to the AC load 3a. When the power conversion from the AC power source 3b to the DC load 2b is performed, the single-phase AC voltage Vac supplied from the AC power source 3b is converted to the DC voltage Vb to be output to the DC load 2b.

A solar battery, a fuel battery, a storage battery or the like is connected to the DC side of the electric power converter 1 when the DC power source 2a is connected thereto, while an electric device, a storage battery or the like is connected to the electric power converter when the DC load 2b is connected thereto. An electric device, a single-phase AC power source or the like is connected to the AC side of the electric power converter 1 when the AC load 3a is connected thereto, while a commercial single-phase AC power source is connected to the electric power converter when the AC power source 3b is connected thereto. The single-phase AC voltage Vac is typically 100 V or 200 V, for example, and the frequency thereof is 50 Hz or 60 Hz, for example.

The electric power converter 1 includes a power conversion unit 10, a controller 20, an LC filter 31, an LCL filter 32, a DC voltage detection unit 33, an AC voltage detection unit 34, and a DC current detection unit 35.

The power conversion unit 10 is connected to the DC power source 2a or the DC load 2b through the LC filter 31 and connected to the AC load 3a or the AC power source 3b through the LCL filter 32. The power conversion unit 10 includes a switching unit 11, a bidirectional switch SW7, a reactor L1, and a capacitor C1.

The switching unit 11 includes six bidirectional switches SW1 to SW6 (corresponding to an example of a first bidirectional switch). Each of the bidirectional switches SW1 to SW6 includes unidirectional switches 51 and 52 formed of a reverse blocking IGBT (Insulated Gate Bipolar Transistor) as illustrated in FIG. 2, where the unidirectional switches 51 and 52 are connected in parallel in mutually reverse directions.

Moreover, the switching unit 11 includes DC nodes $N_U$, $N_V$, and $N_W$ and AC nodes $N_R$ and $N_S$ as illustrated in FIG. 1 where the DC nodes $N_U$, $N_V$, and $N_W$ are provided on the side of the DC power source 2a or the DC load 2b, and the AC nodes $N_R$ and $N_S$ are provided on the side of the AC load 3a or the AC power source 3b. The bidirectional switches SW1 to SW6 are disposed between the DC nodes $N_U$, $N_V$, and $N_W$ and the AC nodes $N_R$ and $N_S$.

Specifically, the bidirectional switch SW1 is connected between the DC node $N_V$ and the AC node $N_R$, and the bidirectional switch SW2 is connected between the DC node $N_V$ and the AC node $N_S$. The bidirectional switch SW3 is connected between the DC node $N_W$ and the AC node $N_R$, and the bidirectional switch SW4 is connected between the DC node $N_W$ and the AC node $N_S$. Moreover, the bidirectional switch SW5 is connected between the DC node $N_U$ and the AC node $N_R$, and the bidirectional switch SW6 is connected between the DC node $N_U$ and the AC node $N_S$.

The bidirectional switch SW7 (corresponding to an example of a second bidirectional switch) is disposed on a path between an anode side of the DC power source 2a or the DC load 2b and the switching unit 11 to perform connection and interruption between the anode side of the DC power source 2a or the DC load 2b and the switching unit 11. The bidirectional switch SW7 has a configuration similar to that of the bidirectional switches SW1 to SW6 as illustrated in FIG. 2, for example.

The reactor L1 is connected between the DC node $N_U$ and the DC node $N_V$. The reactor L1 has a function of inhibiting current from flowing to the capacitor C1 in a step-down mode described below and, in a step-up mode described below, functions as a constant current source to perform a step-up operation.

The controller 20 controls the switching unit 11 and the bidirectional switch SW7 in response to a direction instruction signal pertaining to power conversion that is not illustrated, voltage detected by the DC voltage detection unit 33 and the AC voltage detection unit 34, and current detected by the DC current detection unit 35. There will now be described a case where the power conversion from the DC power source 2a to the AC load 3a is performed. Note that the description of an operation performed in the power conversion from the AC load 3a to the DC power source 2a will be omitted as it is the same as the description provided for the power conversion performed from the DC power source 2a to the AC load 3a as long as a sign of the current detected by the DC current detection unit 35 is reversed. Moreover, the operation performed in the power conversion between the AC power source 3b and the DC load 2b is similar to the operation performed in the power conversion between the DC power source 2a and the AC load 3a.

The bidirectional switches SW1 to SW6 of the switching unit 11 and the bidirectional switch SW7 are driven by drive signals S1 to S7 output from the controller 20, respectively. Each of the drive signals S1 to S7 becomes an on command to switch each of the bidirectional switches SW1 to SW7 to an on state when in a High level. The control performed on the bidirectional switches SW1 to SW7 by the controller 20 will be described in detail later.

The LC filter 31 includes a reactor L2 and a capacitor C2 and is connected between the DC power source 2a and the power conversion unit 10. The LC filter 31 is employed to remove a high frequency component from the power conversion unit 10 to the DC power source 2a. Note that a smoothing capacitor is disposed between the power conversion unit 10 and the DC load 2b when the single-phase AC voltage Vac supplied from the AC power source 3b is stepped up/down to be converted to the DC voltage Vb that is output to the DC load 2b.

The LCL filter 32 includes reactors L3 and L4 connected in series and a capacitor C3 connected to a connection point between the reactors L3 and L4, and is connected between the power conversion unit 10 and the AC load 3a. The LCL filter 32 is employed to remove a high frequency component from the power conversion unit 10 to the AC load 3a.

The DC voltage detection unit 33 is connected between an cathode and the anode of the DC power source 2a to detect the DC voltage Vb output from the DC power source 2a. The detected result is then notified from the DC voltage detection unit 33 to the controller 20.

The AC voltage detection unit 34 is connected between output terminals $T_R$ and $T_S$ to detect the single-phase AC voltage Vac output from the power conversion unit 10 to the AC load 3a. The detected result is then notified from the AC voltage detection unit 34 to the controller 20.

The DC current detection unit 35 detects current flowing through the reactor L1. The DC current detection unit 35 is a current sensor using a Hall element that is a magneto-electric conversion element, for example.

The electric power converter 1 configured as described above can thus perform the DC/AC power conversion in the reversible manner. The controller 20 controls the power conversion unit 10 to perform the power conversion from the DC voltage Vb to the single-phase AC voltage Vac and the power conversion from the single-phase AC voltage Vac to the DC voltage Vb.

When the DC power source 2a is the solar battery and the AC load 3a is the single-phase AC power source, for example, the controller 20 controls the bidirectional switches SW1 to SW7 to convert the DC voltage Vb supplied from the solar battery to the single-phase AC voltage Vac synchronous with the single-phase AC power source, thereby outputting the single-phase AC voltage to the single-phase AC power source. The control described here is a PWM control performed on the power conversion unit 10 with an on/off ratio that is adjusted on the basis of the DC voltage Vb of the solar battery detected by the DC voltage detection unit 33 and the single-phase AC voltage Vac of the single-phase AC power source detected by the AC voltage detection unit 34.

When the DC power source 2a is a secondary battery (storage battery) and the AC load 3a is the single-phase AC power source, for example, the single-phase AC voltage Vac supplied from the single-phase AC power source is converted to the DC voltage Vb to flow a charge current to the secondary battery. The control described here is the PWM control performed on the power conversion unit 10 with an on/off ratio adjusted on the basis of a control signal that is generated when the controller 20 compares a current value detected by the DC current detection unit 35 with a current command and performs proportional integral (PI) control on the amount of deviation.

Now, there will be specifically described an example of an operation performed when the power conversion from the DC voltage Vb to the single-phase AC voltage Vac is performed. When the amplitude of the single-phase AC voltage Vac is higher than that of the DC voltage Vb, an absolute value of an instantaneous value of the single-phase AC voltage Vac is higher or lower than the DC voltage Vb depending on the case within a single cycle of the single-phase AC voltage Vac. A step-up is required when the DC voltage Vb is lower than the single-phase AC voltage Vac, while a step-down is required when the DC voltage Vb is higher than the single-phase AC voltage Vac.

Accordingly, the controller 20 controls the power conversion unit 10 in four control modes including a positive step-down mode, a positive step-up mode, a negative step-down mode, and a negative step-up mode within the single cycle of the single-phase AC voltage Vac when the power conversion from the DC voltage Vb to the single-phase AC voltage Vac is performed.

FIGS. 3 and 4 are diagrams illustrating the control operation performed by the controller 20 within the single cycle of the single-phase AC voltage Vac. FIG. 3 illustrates the relationship between drive signals S1 to S7 driving the corresponding bidirectional switches SW1 to SW7 and each control mode where Ton and Toff in the step-down mode indicate sections in which a PWM signal 1 is turned on and turned off, respectively, while Ton and Toff in the step-up mode indicate sections in which a PWM signal 2 is turned on and turned off, respectively. Moreover, FIG. 4 illustrates the relationship between a transformation ratio MI1 and a step-up switch ratio MI2 and each of the PWM signals 1 and 2 as well as a state of each of the bidirectional switches SW1 to SW7 in a period A (the positive step-down mode), a period B (the positive step-up mode), a period C (the negative step-down mode), and a period D (the negative step-up mode).

The PWM signal 1 is a PWM signal determined on the basis of the transformation ratio MI1 that is expressed as a ratio of an output voltage command Vac* to the voltage Vb of the DC power source 2a. The transformation ratio MI1 is expressed as in expression (1) below.

$$MI1 = Ton/Tc = |Vac^*|/Vb \ldots \quad (1)$$

The PWM signal 2 is a PWM signal determined on the basis of the step-up switch ratio MI2. The step-up switch ratio MI2 is expressed as in expression (2) below.

$$MI2 = Ton/Tc = 1 - 1/MI1 \ldots \quad (2)$$

Note that Tc and Ton indicate a fixed cycle time and an on time in the PWM control, respectively.

The step-up switch ratio MI2 is limited to not get smaller than zero. As a result, the step-up switch ratio MI2 is fixed to zero when the transformation ratio MI1 equals 1 or smaller. The transformation ratio MI1 and the step-up switch ratio MI2 take positive values by definition but are illustrated as negative values in the figure when the output voltage command Vac* is negative, for the sake of convenience. Each control mode will now be described specifically.

Positive Step-Down Mode

First, the positive step-down mode will be described. In the positive step-down mode, the controller 20 constantly turns on the bidirectional switches SW4 and SW5 and intermittently turns on the bidirectional switches SW2 and SW7 (refer to FIGS. 3 and 4) to cause the DC voltage Vb to be intermittently output from the switching unit 11. The voltage output from the switching unit 11 is output to the AC load 3a after the high frequency component is removed from the voltage by the LCL filter 32. This causes the DC voltage Vb to be stepped down, whereby a positive voltage portion of the single-phase AC voltage Vac, an absolute value of which equals the DC voltage Vb or less, is output to the AC load 3a.

In the positive step-down mode described above, the PWM signal of the bidirectional switch SW2 is an inverted signal of the aforementioned PWM signal 1, and the PWM signal of the bidirectional switch SW7 is identical to the aforementioned PWM signal 1.

The output voltage command Vac* is a command generated by the controller 20 and is expressed as in expression (3) below by an rms value Vo* of the single-phase AC voltage Vac and a frequency fo* of the single-phase AC voltage Vac.

$$Vac^* = Vop^* \cos \omega o^* t = \sqrt{2} \times Vo^* \cos 2\pi fo^* t \ldots \quad (3)$$

Note that Vop* indicates a peak value command of the single-phase AC voltage, and ωo* indicates an angular frequency command.

Figure 5A:
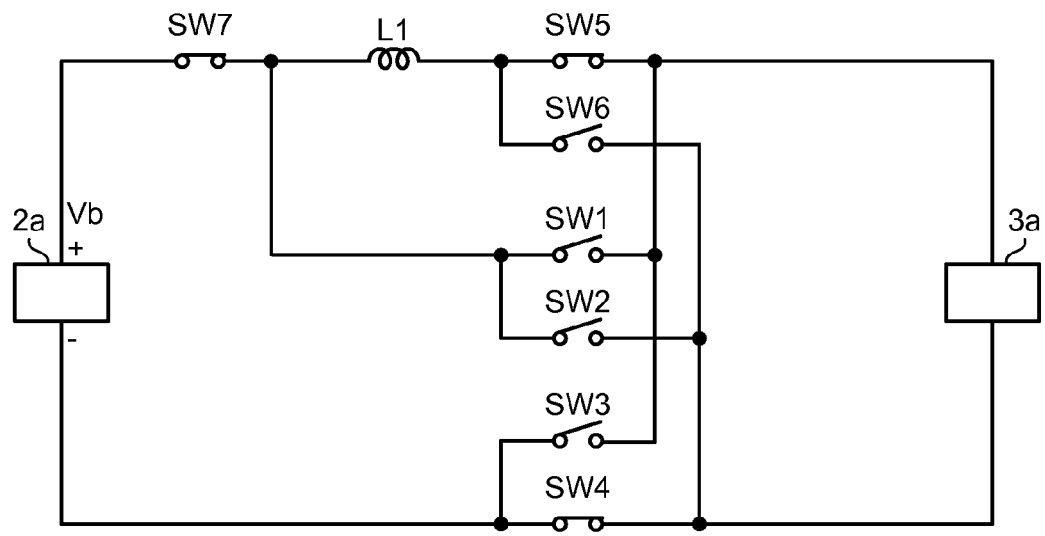
FIG. 5A is a diagram illustrating a state of the bidirectional switch in a positive step-down mode.
Figure 5B:
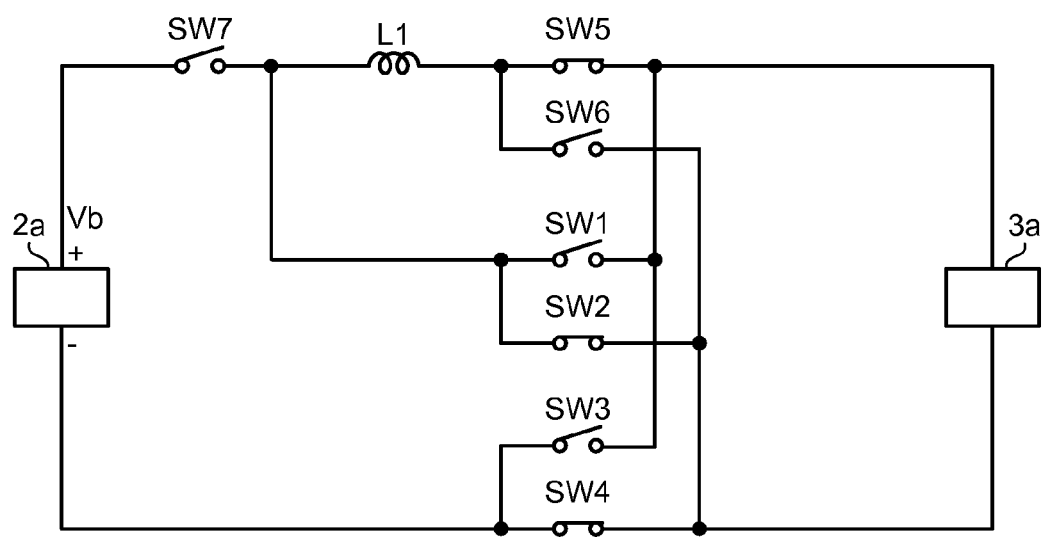
FIG. 5B is a diagram illustrating a state of the bidirectional switch in the positive step-down mode.

Here, the state of each of the bidirectional switches SW1 to SW7 in the positive step-down mode will be described. FIGS. 5A and 5B are diagrams illustrating the state of the bidirectional switches SW1 to SW7 in the positive step-down mode.

FIG. 5A illustrates the state of the switches when the bidirectional switch SW2 is turned off in the positive step-down mode. Accordingly, the current flows through the path including the anode of the DC power source 2a, the bidirectional switch SW7, the reactor L1, the bidirectional switch SW5, the AC load 3a, the bidirectional switch SW4, and the cathode of the DC power source 2a.

FIG. 5B illustrates the state of the switches when the bidirectional switch SW2 is turned on. Accordingly, the current flows in a circulation mode through the path including one end of the bidirectional switch SW2, the reactor L1, the bidirectional switch SW5, the AC load 3a, and the other end of the bidirectional switch SW2.

In the circulation mode, the controller 20 turns off the bidirectional switch SW7 and interrupts the path between the anode side of the DC power source 2a and the power conversion unit 10. This interrupts the path between the anode side of the DC power source 2a and the AC load 3a, thereby preventing the potential change of the high frequency from being applied to the anode side of the DC power source 2a.

In the positive step-down mode, the controller 20 constantly turns on the bidirectional switches SW4 and SW5 and alternately turns on the bidirectional switches SW2 and SW7 to output a pulse voltage. In the positive step-down mode, the bidirectional switch SW4 is constantly turned on, while the cathode side of the DC power source 2a is connected to the AC node $N_S$. This can therefore prevent the common mode voltage of the DC power source 2a from being inconstant in the positive step-down mode.

Positive Step-up Mode

Next, the positive step-up mode will be described. In the positive step-up mode, the controller 20 constantly turns on the bidirectional switches SW4 and SW7 and alternately turns on the bidirectional switches SW5 and SW6 (refer to FIGS. 3 and 4) to store electric energy in the reactor L1 as well as radiate the energy therefrom. The electric energy radiated from the reactor L1 is smoothed by the capacitor C1 and output from the power conversion unit 10. This causes the DC voltage Vb to be stepped up, whereby a positive voltage portion of the single-phase AC voltage Vac, an absolute value of which is larger than the DC voltage Vb, is output to the AC load 3a.

In the positive step-up mode described above, the PWM signal of the bidirectional switch SW6 is identical to the aforementioned PWM signal 2, and the PWM signal of the bidirectional switch SW5 is an inverted signal of the aforementioned PWM signal 2.

Figure 6A:
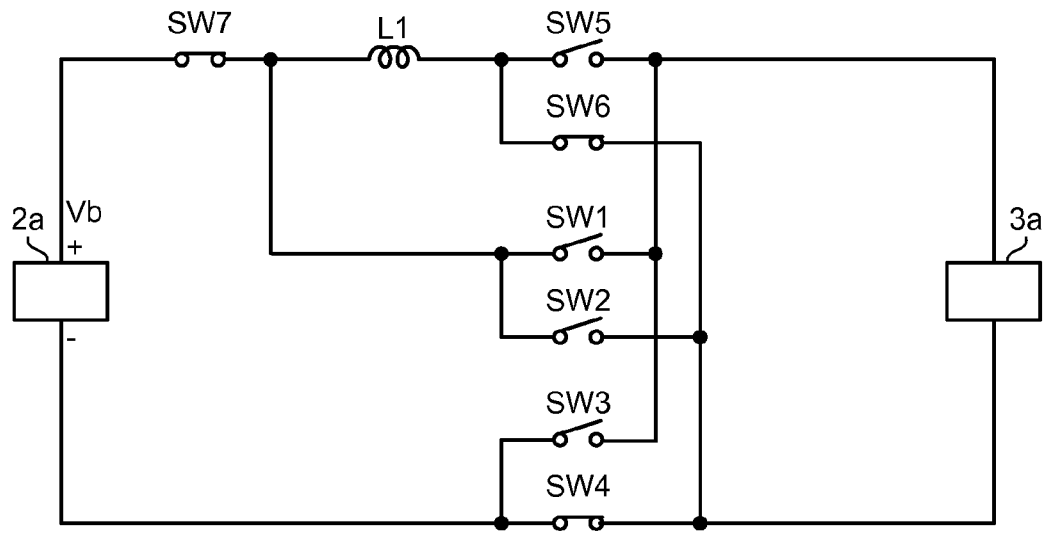
FIG. 6A is a diagram illustrating a state of the bidirectional switch in a positive step-up mode.
Figure 6B:
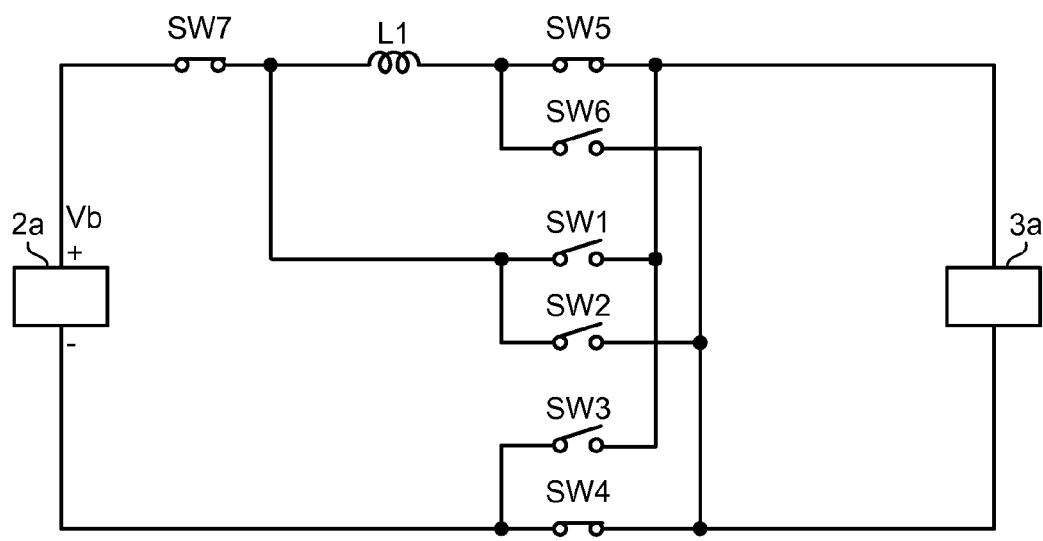
FIG. 6B is a diagram illustrating a state of the bidirectional switch in the positive step-up mode.

Here, the state of each of the bidirectional switches SW1 to SW7 in the positive step-up mode will be described. FIGS. 6A and 6B are diagrams illustrating the state of the bidirectional switches SW1 to SW7 in the positive step-up mode.

FIG. 6A illustrates the state of the switches when the bidirectional switch SW6 is turned on and the bidirectional switch SW5 is turned off in the positive step-up mode. Accordingly, the current flows through the path including the anode of the DC power source 2a, the bidirectional switch SW7, the reactor L1, the bidirectional switch SW6, the bidirectional switch SW4, and the cathode of the DC power source 2a. The current energy is stored in the reactor L1 as a result.

FIG. 6B illustrates the state of the switches when the bidirectional switch SW6 is turned off and the bidirectional switch SW5 is turned on from the aforementioned state. Accordingly, there is formed the path including the anode of the DC power source 2a, the bidirectional switch SW7, the reactor L1, the bidirectional switch SW5, the AC load 3a, the bidirectional switch SW4, and the cathode of the DC power source 2a so that the electric energy stored in the reactor L1 is radiated toward the AC load 3a.

In the positive step-up mode, the controller 20 constantly turns on the bidirectional switches SW4 and SW7 and alternately turns on the bidirectional switches SW5 and SW6 to output a positive pulse voltage that is stepped up. As is the case with the positive step-down mode, the bidirectional switch SW4 is constantly turned on so that the cathode side of the DC power source 2a is connected to the AC node $N_s$ in the positive step-up mode. This can therefore prevent the common mode voltage of the DC power source 2a from being inconstant in the positive step-up mode.

Negative Step-Down Mode

In the negative step-down mode, the controller 20 constantly turns on the bidirectional switches SW3 and SW6 and intermittently turns on the bidirectional switches SW1 and SW7 (refer to FIGS. 3 and 4) to cause the DC voltage Vb to be intermittently output from the switching unit 11. The voltage output from the switching unit 11 is output to the AC load 3a after the high frequency component is removed from the voltage by the LCL filter 32. This causes the DC voltage Vb to be stepped down, whereby a negative voltage portion of the single-phase AC voltage Vac, an absolute value of which equals the DC voltage Vb or less, is output to the AC load 3a.

In the negative step-down mode described above, the PWM signal of the bidirectional switch SW1 is identical to the aforementioned PWM signal 1, and the PWM signal of the bidirectional switch SW7 is an inverted signal of the aforementioned PWM signal 1.

Figure 7A:
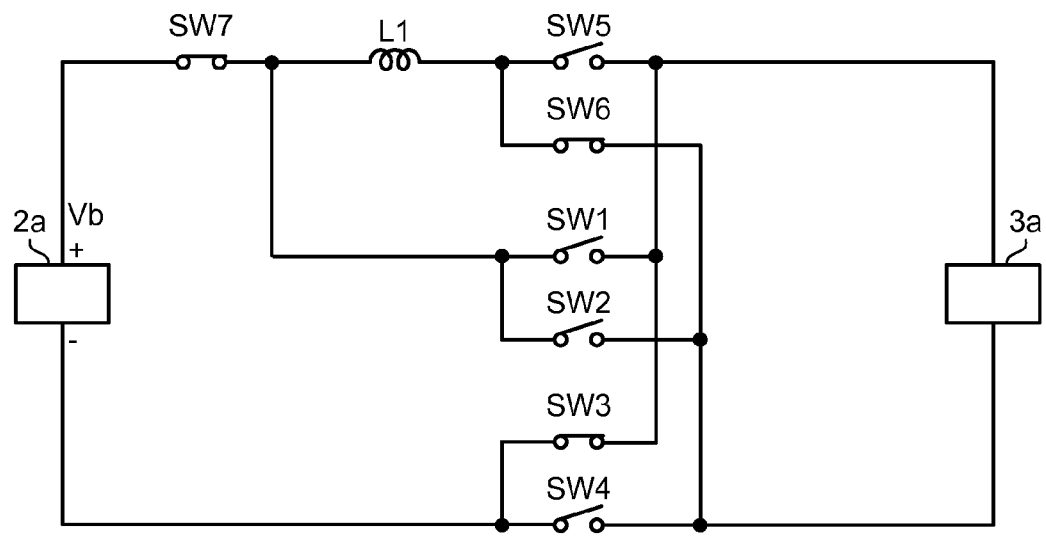
FIG. 7A is a diagram illustrating a state of the bidirectional switch in a negative step-down mode.
Figure 7B:
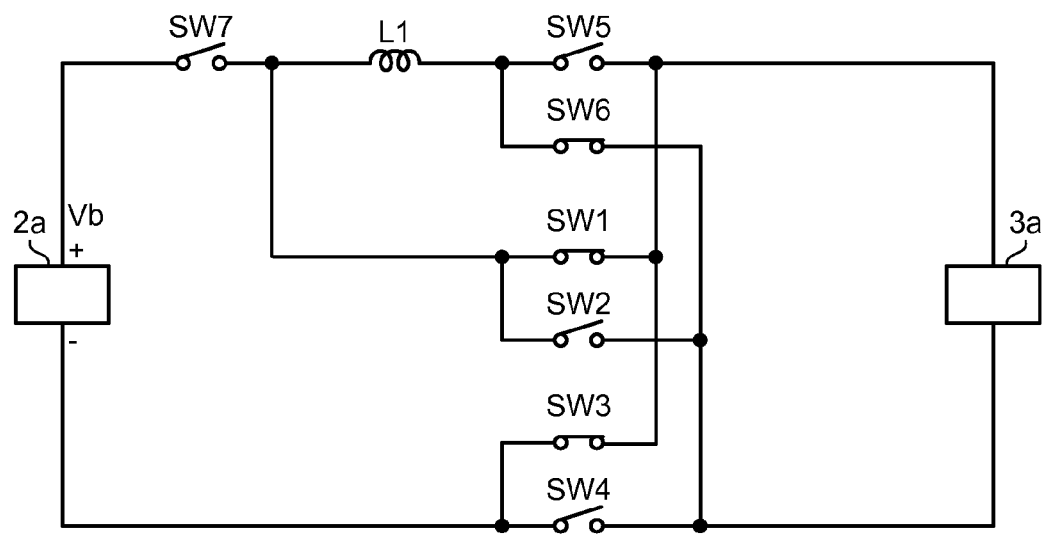
FIG. 7B is a diagram illustrating a state of the bidirectional switch in the negative step-down mode.

Here, the state of each of the bidirectional switches SW1 to SW7 in the negative step-down mode will be described. FIGS. 7A and 7B are diagrams illustrating the state of the bidirectional switches SW1 to SW7 in the negative step-down mode.

FIG. 7A illustrates the state of the switches when the bidirectional switch SW1 is turned off in the negative step-down mode. Accordingly, the current flows through the path including the anode of the DC power source 2a, the bidirectional switch SW7, the reactor L1, the bidirectional switch SW6, the AC load 3a, the bidirectional switch SW3, and the cathode of the DC power source 2a.

FIG. 7B illustrates the state of the switches when the bidirectional switch SW1 is turned on. Accordingly, the current flows in a circulation mode through the path including the one end of the bidirectional switch SW1, the reactor L1, the bidirectional switch SW6, the AC load 3a, and the other end of the bidirectional switch SW1.

In the circulation mode, the controller 20 turns off the bidirectional switch SW7 and interrupts the path between the anode side of the DC power source 2a and the power conversion unit 10. This interrupts the path between the anode side of the DC power source 2a and the AC load 3a, thereby preventing the potential change of the high frequency from being applied to the anode side of the DC power source 2a.

In the negative step-down mode, the bidirectional switch SW3 is constantly turned on so that the cathode side of the DC power source 2a is connected to the AC node $N_R$. This can therefore prevent the common mode voltage of the DC power source 2a from being inconstant in the negative step-down mode, as is the case with the positive step-down mode and the positive step-up mode.

Negative Step-up Mode

Next, the negative step-up mode will be described. In the negative step-up mode, the controller 20 constantly turns on the bidirectional switches SW3 and SW7 and alternately turns on the bidirectional switches SW5 and SW6 (refer to FIGS. 3 and 4) to store the electric energy in the reactor L1 as well as radiate the energy therefrom. The electric energy radiated from the reactor L1 is smoothed by the capacitor C1 and output from the power conversion unit 10. This causes the DC voltage Vb to be stepped up, whereby a negative voltage portion of the single-phase AC voltage Vac, an absolute value of which is larger than the DC voltage Vb, is output to the AC load 3a.

In the negative step-up mode described above, the PWM signal of the bidirectional switch SW6 is identical to the aforementioned PWM signal 2, and the PWM signal of the bidirectional switch SW5 is the inverted signal of the aforementioned PWM signal 2.

Figure 8A:
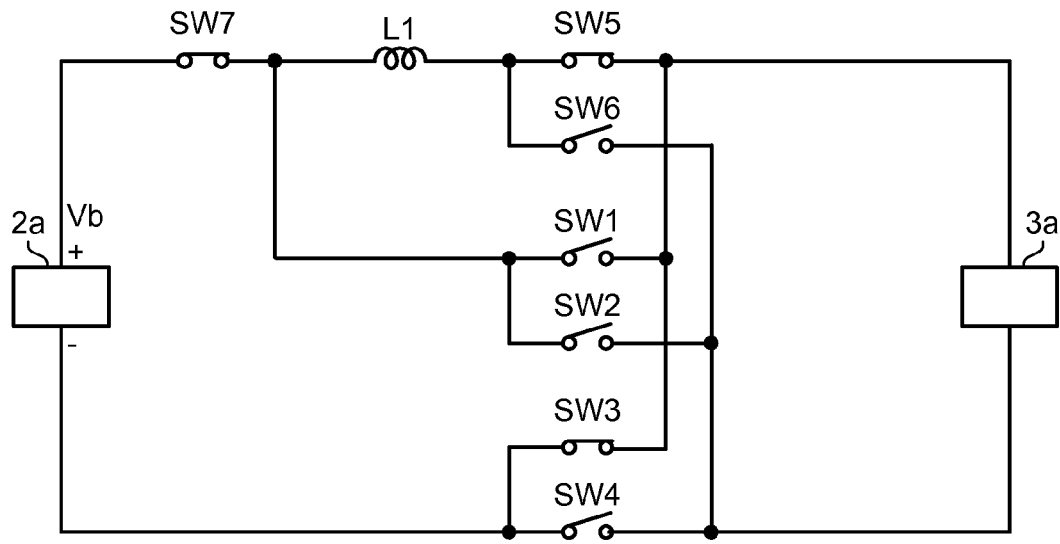
FIG. 8A is a diagram illustrating a state of the bidirectional switch in a negative step-up mode.
Figure 8B:
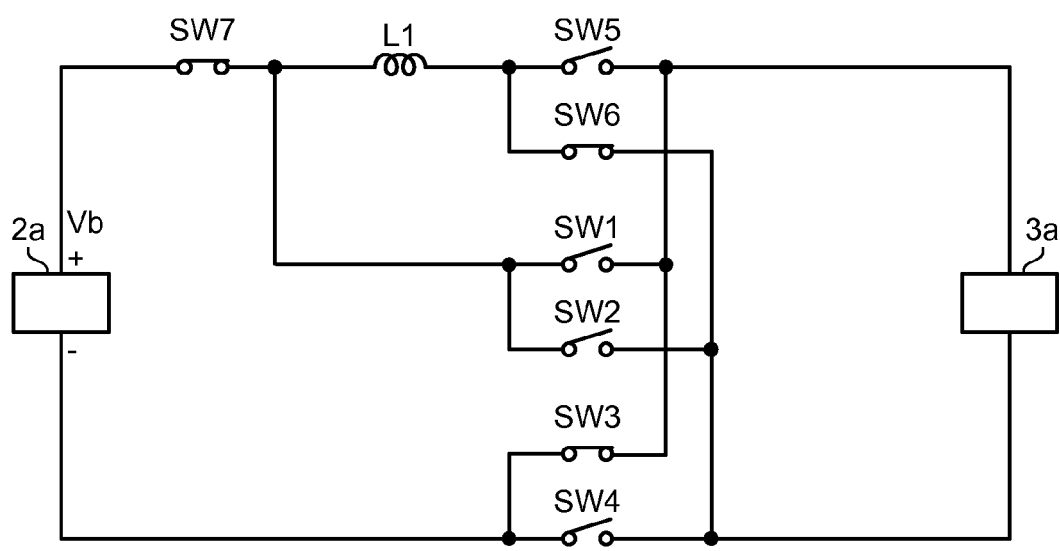
FIG. 8B is a diagram illustrating a state of the bidirectional switch in the negative step-up mode.

Here, the state of each of the bidirectional switches SW1 to SW7 in the negative step-up mode will be described. FIGS. 8A and 8B are diagrams illustrating the state of the bidirectional switches SW1 to SW7 in the negative step-up mode.

FIG. 8A illustrates the state of the switches when the bidirectional switch SW5 is turned on and the bidirectional switch SW6 is turned off in the negative step-up mode. Accordingly, the current flows through the path including the anode of the DC power source 2a, the bidirectional switch SW7, the reactor L1, the bidirectional switch SW5, the bidirectional switch SW3, and the cathode of the DC power source 2a. The current energy is stored in the reactor L1 as a result.

FIG. 8B illustrates the state of the switches when the bidirectional switch SW5 is turned off and the bidirectional switch SW6 is turned on from the aforementioned state. Accordingly, there is formed the path including the anode of the DC power source 2a, the bidirectional switch SW7, the reactor L1, the bidirectional switch SW6, the AC load 3a, the bidirectional switch SW3, and the cathode of the DC power source 2a so that the electric energy stored in the reactor L1 is radiated toward the AC load 3a.

In the negative step-up mode, the controller 20 constantly turns on the bidirectional switches SW3 and SW7 and alternately turns on the bidirectional switches SW5 and SW6 to output a negative pulse voltage that is stepped up. As is the case with the negative step-down mode, the bidirectional switch SW3 is constantly turned on so that the cathode side of the DC power source 2a is connected to the AC node $N_R$ in the negative step-up mode. This can therefore prevent the common mode voltage of the DC power source 2a from being inconstant in the negative step-up mode as with another control mode.

As described above, the electric power converter 1 according to the present embodiment includes the switching unit 11 having the bidirectional switches SW1 to SW6, and the bidirectional switch SW7 disposed on the path between one pole of the DC power source 2a and the switching unit 11.

These bidirectional switches SW1 to SW7 are controlled by the controller 20, whereby the DC voltage Vb supplied from the DC power source 2a is converted to the AC voltage and output to the side of the AC load 3a. The controller 20 turns off the bidirectional switch SW7 to prevent the potential change of high frequency from being applied to the anode side of the DC power source 2a.

When turning off the bidirectional switch SW7, the controller 20 turns on the bidirectional switch, from among the bidirectional switches SW1 to SW6, that is connected between the other pole of the DC power source 2a and the AC load 3a. The controller 20 turns on the bidirectional switch SW4 in the positive step-down mode and the positive step-up mode, and turns on the bidirectional switch SW3 in the negative step-down mode and the negative step-up mode, for example. As a result, the other pole of the DC power source 2a and the AC load 3a are connected to be able to prevent the common mode voltage of the DC power source 2a from being inconstant.

Moreover, in the section where the positive voltage of the single-phase AC voltage Vac is output, the controller 20 continuously turns on a specific bidirectional switch (such as the bidirectional switch SW4) connected between the other pole of the DC power source 2a and the AC load 3a in order to continuously connect the cathode side of the DC power source 2a to the AC node $N_S$. Moreover, in the section where the negative voltage of the single-phase AC voltage Vac is output, the controller continuously turns on a specific bidirectional switch (such as the bidirectional switch SW3) connected between the other pole of the DC power source 2a and the AC load 3a in order to continuously connect the cathode side of the DC power source 2a to the AC node $N_R$. Accordingly, the bidirectional switch connected between the other pole of the DC power source 2a and the AC load 3a is switched twice within the single cycle of the single-phase AC voltage Vac. This can inhibit the high frequency component from being superposed onto the common mode voltage of the DC power source 2a, thereby allowing the common mode voltage of the DC power source 2a to be stable.

Note that the bidirectional switch SW7 instead of a combination of a switching element and a protective diode is disposed on the path between the one pole of the DC power source 2a and the switching unit 11 because the current direction of the DC power is switched between positive/negative directions.

When the single-phase AC voltage Vac is output from the power conversion unit 10 with the circuit configuration including a capacitor on the side of the AC load 3a, for example, the power factor of the AC power output from the power conversion unit 10 is not equal to 1. The power factor of the AC power output from the power conversion unit 10 is not equal to 1 either when the AC load 3a serves as the single-phase AC power source of a power system and a reactive current is flown to the AC side to detect a power outage or the like in interconnection with the power system.

When the power factor of the AC power output from the power conversion unit 10 is not equal to 1, the direction of power is alternately switched to the positive and negative directions considering instantaneous power generated with the single-phase AC current. Therefore, when the DC power is input from the DC power source 2a, the current direction of the DC power is switched between the positive/negative directions in the attempt to switch the direction of power to the positive/negative directions.

Moreover, while the electric power converter that can perform step up/down is described as the example in the aforementioned embodiments, an electric power converter only performing step-down can stabilize the common mode voltage of the DC power source 2a as well by performing the control similar to what is described above.

Furthermore, as described above, the DC load 2b and the AC power source 3b are connected to the DC side and the AC side of the electric power converter 1, respectively, so that the AC voltage supplied from the AC power source 3b can be converted to the DC voltage to be output to the DC load 2b as well. The common mode voltage can be stabilized in this case as well by performing the control similar to what is described above.

Further effects and variations can easily be derived by those skilled in the art. Therefore, the present invention in its broader aspect is not to be limited to the specific details and the representative embodiments expressed and described above. Various modification can thus be made without departing from the spirit or scope of the overall concept of the invention defined by the attached claims and its equivalents.

What is claimed is:

1. An electric power converter comprising:
   a switching unit that includes a plurality of first bidirectional switches disposed between a DC power source and an AC load or between a DC load and an AC power source;
   a controller configured to control the switching unit to perform power conversion between DC power and AC power; and
   a second bidirectional switch that is disposed on a path between one pole of the DC power source or one pole of the DC load and the switching unit to perform connection and interruption between the one pole of the DC power source or the one pole of the DC load and the switching unit, wherein
   the controller turns on one of the plurality of first bidirectional switches connected between another pole of the DC power source and the AC load or between another pole of the DC load and the AC power source when turning off the second bidirectional switch, wherein the switching unit includes:
first and second DC nodes provides on a side of the one pole of the DC power source or the one pole of the DC load;
a third DC node provided on a side of the another pole of the DC power source or the another pole of the DC load;
a third DC node provided on a side of the another pole of the DC power source or the another pole of the DC load; and
two AC nodes provided on a side of the AC load or the AC power source, the plurality of first bidirectional switches are disposed to connect each of the first to third DC nodes and each of the AC nodes, and a reactor is provided between the first DC node and the second DC node.

2. The electric power converter according to claim 1, wherein
the second bidirectional switch is connected between a positive pole side of the DC power source or the DC load and the switching unit.

3. The electric power converter according to claim 1, further comprising:
a capacitor connected between the AC nodes, wherein
the controller controls the plurality of first bidirectional switches and the second bidirectional switch to step up/down DC voltage supplied from the DC power source to generate AC voltage.

4. The electric power converter according to claim 2, further comprising:
a capacitor connected between the AC nodes, wherein
the controller controls the plurality of first bidirectional switches and the second bidirectional switch to step up/down DC voltage supplied from the DC power source to generate AC voltage.

5. The electric power converter according to claim 1, further comprising:
a capacitor connected between the first DC node and the third DC node, wherein
the controller controls the plurality of first bidirectional switches and the second bidirectional switch to step up/down AC voltage supplied from the AC power source to generate DC voltage.

6. The electric power converter according to claim 2, further comprising:
a capacitor connected between the first DC node and the third DC node, wherein
the controller controls the plurality of first bidirectional switches and the second bidirectional switch to step up/down AC voltage supplied from the AC power source to generate DC voltage.

7. The electric power converter according to claim 1, wherein
the controller controls the switching unit to perform power conversion bidirectionally between the DC power source and the AC load or between the DC load and the AC power source.

8. The electric power converter according to claim 2, wherein
the controller controls the switching unit to perform power conversion bidirectionally between the DC power source and the AC load or between the DC load and the AC power source.

9. An electric power converter comprising:
a switching unit that includes a plurality of first bidirectional switches disposed between a DC power source and an AC load or between a DC load and an AC power source;
a controller configured to control the switching unit to perform power conversion between DC power and AC power; and
a second bidirectional switch that is disposed on a path between one pole of the DC power source or one pole of the DC load and the switching unit to perform connection and interruption between the one pole of the DC power source or the one pole of the DC load and the switching unit, wherein
the controller turns on one of the plurality of first bidirectional switches connected between another pole of the DC power source and the AC load or between another pole of the DC load and the AC power source when turning off the second bidirectional switch,
the plurality of first bidirectional switches include a third bidirectional switch that connects between the another pole of the DC power source and one end of the AC load or between the another pole of the DC load and one end of the AC power source and a fourth bidirectional switch that connects between the another pole of the DC power source and another end of the AC load or between the another pole of the DC load and another end of the AC power source,
the controller, when the second bidirectional switch turns off, turns off one of the third and fourth bidirectional switches and turns on the other of the third and fourth bidirectional switch based on a voltage polarity of the AC load or a voltage polarity of the AC power source,
the switching unit includes:
first and second DC nodes provided on a side of the one pole of the DC power source or the one pole of the DC load;
a third DC node provided on a side of the another pole of the DC power source or the another pole of the DC load; and
two AC nodes provided on a side of the AC load or the AC power source, the plurality of first bidirectional switches are disposed to connect each of the first to third DC nodes and each of the AC nodes, and a reactor is provided between the first DC node and the second DC node.

10. A control method for an electric power converter comprising:
connecting between a DC power source and an AC load or between a DC load and an AC power source by controlling a switching unit and a second bidirectional switch that is disposed on a path between one pole of the DC power source or one pole of the DC load and the switching unit, the switching unit including a plurality of first bidirectional switches that connect between the DC power source and the AC load or between the DC load and the AC power source;
turning off the second bidirectional switch;
turning on one of the first plurality bidirectional switches that connects between another pole of the DC power source and the AC load or between another pole of the DC load and the AC power source when the second bidirectional switch is off; and turning off the one of the first plurality bidirectional switches when the second bidirectional switch is on, wherein the switching unit includes:
  first and second DC nodes provided on a side of the one pole of the DC power source or the one pole of the DC load;
  a third DC node provided on a side of the another pole of the DC power source or the another pole of the DC load; and
  two AC nodes provided on a side of the AC load or the AC power source,
the plurality of first bidirectional switches are disposed to connect each of the first to third DC nodes and each of the AC nodes, and
a reactor is provided between the first DC node and the second DC node.

\* \* \* \* \*